April 6, 1926.  
E. HAAS  
1,579,478
ANTISKIDDING DEVICE FOR AUTOMOBILES
Filed Jan. 28, 1925 2 Sheets-Sheet 1
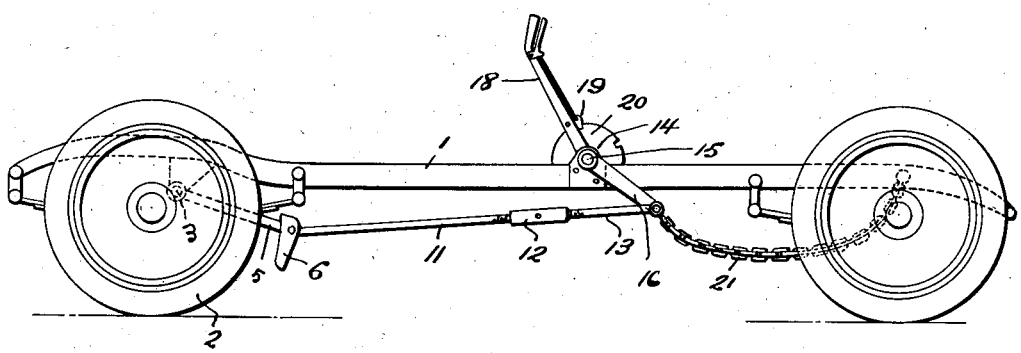
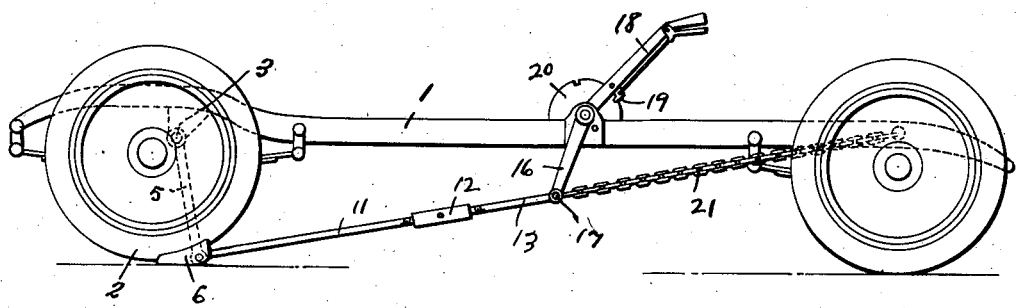
Edward Haas,
INVENTOR April 6, 1926. 1,579,478
E. HAAS
ANTISKIDDING DEVICE FOR AUTOMOBILES
Filed Jan. 28, 1925 2 Sheets-Sheet 2

Edward Haas
INVENTOR

Patented Apr. 6, 1926.

1,579,478

UNITED STATES PATENT OFFICE.

EDWARD HAAS, OF SAN ANTONIO, TEXAS, ASSIGNOR OF ONE-HALF TO WILLIAM V. DIELMANN, OF SAN ANTONIO, TEXAS.

ANTISKIDDING DEVICE FOR AUTOMOBILES.

Application filed January 28, 1925. Serial No. 5,346.

*To all whom it may concern:*

Be it known that I, EDWARD HAAS, a citizen of the United States, residing at San Antonio, in the county of Bexar and State of Texas, have invented new and useful Improvements in Antiskidding Devices for Automobiles, of which the following is a specification.

The object of my invention is to improve the type of anti-skidding devices that comprise brake shoes adapted to be dropped beneath the rear wheels of an automobile, by the provision of a construction that is simple effective in operation and susceptible of being quickly applied and released.

To the attainment of the foregoing, the invention consists in the improvement to be hereinafter described and definitely claimed.

In the accompanying drawings, forming part of this specification:

Figure 1 is a side elevation showing my improvement in released position.

Figure 2 is a side elevation with the improvement in applied position.

Similar numerals designate corresponding parts in all of the views of the drawings.

Figure 3:
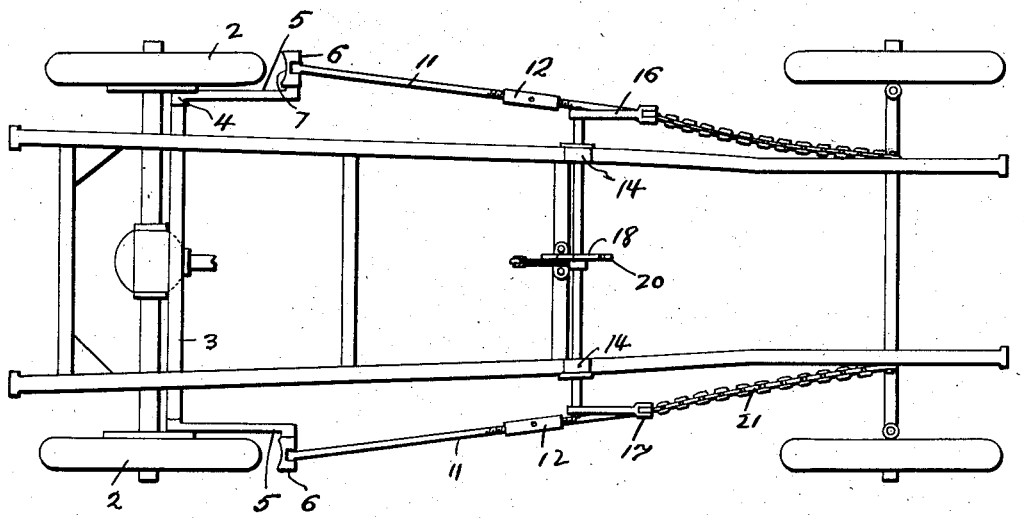
Figure 3 is a top plan view showing the improvement as released.
Figure 4:
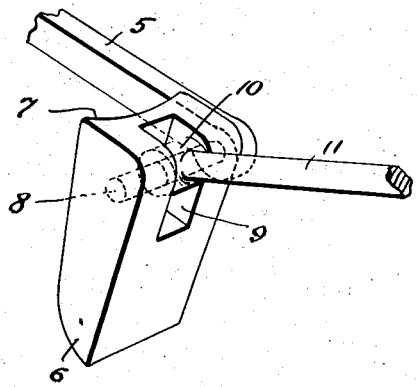
Figure 4 is an enlarged fragmentary of perspective showing one of the shoes of the device and the connections complementary thereto.

I illustrate my improvement in conjunction with an automobile of the ordinary construction, the chassis of the automobile being designated by 1 and the rear wheels by 2.

A transverse shaft 3 is appropriately supported and carried at the underside of the rear portion of the chassis 1, and pivotally connected at 4 to the said shaft are arms 5. Each of these arms 5 is equipped with a tapered shoe 6 of steel or other appropriate material, the shoes being concaved cross section at their rear sides as designated by 7 so as to conform to the tires on the wheels 2. In the connection of the shoes 6, the arms 5 are provided at 8 with lateral journal pins on which the shoes are pivotally mounted so that normally the shoes will rest in pendent position on the arms as appears in Figure 1. It will also be understood in this connection that when the arms 5 are swung downwardly, the shoes 6 by engaging the ground will be directed rearwardly so as to assure the shoes assuming the position shown in Figure 2 when the shoes are thrust rearwardly as hereinafter described.

The upper forward portions of the shoes 6 are kerfed as designated by 9 and it will be noted that the said kerfs 9 are intersected by the said journaled pins 8 so that heads 10 pivotally mounted on the pins 8 are enabled to rest in the kerfs 9 and be held against lateral deflection by the same. The heads 10 are carried at the rear ends of the rods 11 which are connected by turn buckles 12 with forward rods 13.

Journalled at 14 in appropriate bearings on the chassis 1 is a transverse rock shaft 15 with cranks 16 at its ends, pivotally connected at 17 with the forward ends of the rods 13. The said shaft 14 is also equipped with a hand lever 18 provided with a detent 19 for cooperation with a segmental rack 20 fixed to the chassis 1.

Interposed between and connected to the forward ends of the rods 13 and the forward portion of the chassis are cables 21 preferably in the form of chains, and calculated, when the device is applied as shown in Figure 2 to limit the rear movement of the shoes 6 so as to enable the device to operate to the best advantage in braking the vehicle and in preventing skidding thereof.

In practice, the device when in released state has its parts positioned as shown in Figures 1 and 3. When however, the necessity for braking the rear wheels 2 and for precluding skidding arises it is simply necessary for the automobile driver to release the lever 18 and move the same forwardly when the shoes 6 will be moved downwardly and by contacting with the roadway will position themselves to enter the spaces between the wheels 2 and the roadway with the result that the automobile will be effectively braked and skidding of the automobile will be effectively prevented. For the release of the member it is simply necessary for the operator to swing the lever 18 rearwardly and secure it in the position shown in Figures 1 and 3 when the device will be prevented from interfering in any degree with the usual operation of the automobile.

By reference to Figure 2 it will be apparent, that through the cooperation of the detent 19 with the segmental rack 20, the shoes 6 may, when deemed expedient, be secured in the working position shown in Figure 2, this being advantageous when it is necessary for the automobile to traverse a long stretch of slippery roadway, it being of course necessary to operate the lever 18 in accordance with the advance of the automobile.

In addition to the practical advantages ascribed to my improvement it will be apparent that the improvement as a whole is simple and inexpensive in construction, is sufficiently light in weight, is susceptible of ready application to an automobile, and is effective in operation, notwithstanding but little effort for said operation is required.

Having described my invention, what I claim and desire to secure by Letters-Patent, is:

An anti-skidding device for automobiles comprising vertical swinging arms pivotally connected with the automobile chassis and having lateral journal pins, tapered shoes pivotally mounted on said journal pins and having rear sides of concave cross section and also having kerfs in the forward sides of their upper portions, said kerfs being intersected by said journal pins, rods having heads disposed in said kerfs and pivotally connected to said journal pins, a transverse shaft journalled in bearings on the chassis and having cranks at its ends, said cranks pivotally connected to said rods, means for adjusting and adjustably fixing said transverse shaft, and cables interposed between and connected to the forward portions of said rods and the forward portion of the chassis.

In testimony whereof I affix my signature.

EDWARD HAAS.